United States Patent
Wu (10) Patent No.: US 9,581,853 B2
(45) Date of Patent: Feb. 28, 2017

(54) CURVED LIQUID CRYSTAL DISPLAY PANEL AND CURVED LIQUID CRYSTAL DISPLAY APPARATUS

(71) Applicant: Shenzhen China Star Optoelectronics Technology Co., Ltd., Guangdong (CN)

(72) Inventor: Chuan Wu, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 66 days.

(21) Appl. No.: 14/416,120

(22) PCT Filed: Nov. 19, 2014

(86) PCT No.: PCT/CN2014/091610
§ 371 (c)(1),
(2) Date: Jan. 21, 2015

(87) PCT Pub. No.: WO2016/074263
PCT Pub. Date: May 19, 2016

(65) Prior Publication Data
US 2016/0139457 A1    May 19, 2016

(30) Foreign Application Priority Data
Nov. 14, 2014   (CN) .......................... 2014 1 0650303

(51) Int. Cl.
*G02F 1/1335* (2006.01)
*G02F 1/1343* (2006.01)

(52) U.S. Cl.
CPC .. *G02F 1/133514* (2013.01); *G02F 1/133512* (2013.01); *G02F 1/133524* (2013.01); *G02F 1/134309* (2013.01)

(58) Field of Classification Search
CPC ......... G02F 1/133514; G02F 1/133512; G02F 1/134309; G02F 1/133524
See application file for complete search history.

(56) References Cited

U.S. PATENT DOCUMENTS 7,986,394 B2 * 7/2011 Kamoshida ....... G02F 1/133305
349/110
2008/0137013 A1   6/2008 Kamoshida
2009/0161048 A1   6/2009 Satake et al.

FOREIGN PATENT DOCUMENTS

| CN | 10201486 | 6/2008 |
| CN | 101464582 | 6/2009 |
| CN | 104007575 | 8/2014 |
| JP | 2007-333818 | 12/2007 |
| JP | 2010-008875 | 1/2010 |

* cited by examiner

*Primary Examiner* — Donald Raleigh
*Assistant Examiner* — Kevin Quarterman (57) ABSTRACT

A curved LCD panel is provided. The curved LCD panel comprises a curved color filter substrate and a cured array substrate. A plurality of regions are formed along a longitudinal direction of the color filter substrate. In each of the regions of the color filter substrate, according to a greatest shifted distance between the color filter and the array substrate, a width of the black matrix within the region is predetermined. The black matrix can have different widths in the different regions to prevent the color shifting phenomenon.

18 Claims, 4 Drawing Sheets

Fig.1

PRIOR ART

CURVED LIQUID CRYSTAL DISPLAY PANEL AND CURVED LIQUID CRYSTAL DISPLAY APPARATUS

RELATED APPLICATIONS

This application is a National Phase of PCT Patent Application No. PCT/CN2014/091610 having International filing date of Nov. 19, 2014, which claims the benefit of priority of Chinese Patent Application No. 201410650303.8 filed on Nov. 14, 2014. The contents of the above applications are all incorporated by reference as if fully set forth herein in their entirety.

FIELD OF THE INVENTION

The present invention relates to a technical field of displays, and more particularly to a curved liquid crystal display (LCD) panel and a curved LCD apparatus.

BACKGROUND OF THE INVENTION

Figure 1:
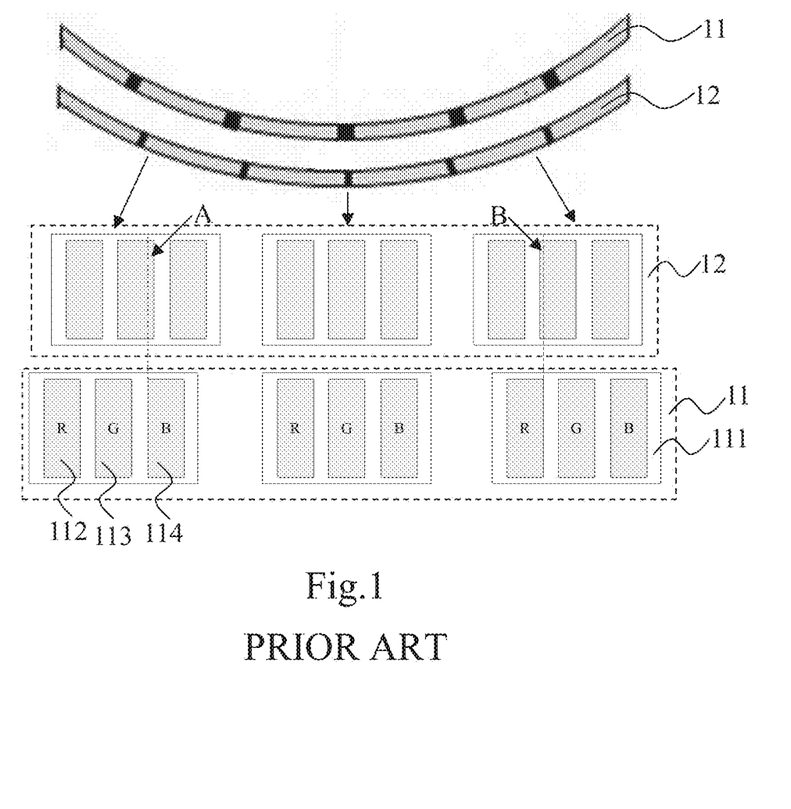
FIG. 1 illustrates a schematic diagram and a partially structural view showing a conventional curved LCD.

A curved LCD is an LCD with a cured structure, comprising a cured color filter substrate 11 and a cured array substrate 12. The color filter substrate 11 can comprise a black matrix 111, red filters 112, green filters 113, and blue filters 114. Refer to FIG. 1, which is a schematic diagram and a partially structural view showing a conventional curved LCD are illustrated.

The black matrix 111 on the color filter substrate 11 is configured to prevent colored lights from being mixed and leaked. In general, the conventional LCD is first made as a flat panel, and the flat panel is curved by a curving process. In the curving process, the color filter substrate and the array substrate may be shifted a distance with respect to each other. Referring to FIG. 1, a left side of the color filter substrate is shifted leftward a distance with respect to the array substrate, and a right side of the color filter substrate is shifted rightward a distance with respect to the array substrate.

The greater a curvature of the cured structure is, the larger the shifted distance between the color filter substrate and the array substrate is, resulting in a color shifting phenomenon. Both the green filters 113 and the blue filters 114 of the color filter substrate 11 may be covered by the green pixels of the array substrate 12. Therefore, when a green image is displayed by a left side of the LCD panel, a blue region (the region A in FIG. 1) may occur at a right side of the green image. In addition, both the green filters 113 and the red filters 112 of the color filter substrate 11 may be covered by the green pixels of the array substrate 12. Therefore, when the green image is displayed by a right side of the LCD panel, a red region (the region B in FIG. 1) may occur at a left side of the green image. Accordingly, a display quality of the curved LCD is greatly degraded.

As a result, it is necessary to provide a curved LCD panel and a curved LCD apparatus to solve the problems existing in the conventional technologies, as described above.

SUMMARY OF THE INVENTION

The present invention provides a curved LCD panel and a curved LCD apparatus, wherein the black matrix can have different widths in the different regions to prevent the color shifting phenomenon. In the conventional curved LCD panel and apparatus, the color shifting phenomenon results from a shifted distance between the color filter substrate and the array substrate, thereby deteriorating a display quality of the LCD.

A primary object of the present invention is to provide a curved LCD panel comprising: a curved color filter substrate comprising a black matrix and color filters; and a cured array substrate opposite the color filter substrate and comprising pixel electrodes, data lines, and scan lines wherein the pixel electrodes correspond to the color filters, respectively; wherein a plurality of regions are formed along a longitudinal direction of the color filter substrate, and in one of the regions positioned at a left side of the color filter substrate, according to a shifted distance between a leftmost color filter of the color filter and a leftmost pixel electrode of the array substrate, a width of the black matrix within the region is predetermined to prevent the color shifting phenomenon from occurring in the region. In one of the regions positioned at a right side of the color filter substrate, according to a shifted distance between a rightmost color filter of the color filter and a rightmost pixel electrode of the array substrate, a width of the black matrix within the region is predetermined to prevent the color shifting phenomenon from occurring in the region. The regions comprise at least one left region, at least one right region, and a middle region along the longitudinal direction of the color filter substrate, and a width of black matrix in the left region is larger than a width of black matrix in the middle region, and a width of black matrix in the right region is larger than a width of black matrix in the middle region.

In the curved LCD panel of the present invention, a width of black matrix in the left region and far away from the middle region is larger than a width of black matrix in the left region and close to the middle region.

In the curved LCD panel of the present invention, a width of black matrix in the right region and far away from the middle region is larger than a width of black matrix in the right region and close to the middle region.

In the curved LCD panel of the present invention, the at least one left region and the at least one right region are positioned symmetrically at the left side and the right side of the middle region, respectively.

Another object of the present invention is to provide a curved LCD panel comprising: a curved color filter substrate comprising a black matrix and color filters; and a cured array substrate opposite the color filter substrate and comprising pixel electrodes, data lines, and scan lines wherein the pixel electrodes correspond to the color filters, respectively; wherein a plurality of regions are formed along a longitudinal direction of the color filter substrate, and in each of the regions of the color filter substrate, according to a greatest shifted distance between the color filter and the array substrate, a width of the black matrix within the region is predetermined to prevent the color shifting phenomenon from occurring in the region.

In the curved LCD panel of the present invention, one of the regions is positioned at a left side of the color filter substrate, according to a shifted distance between a leftmost color filter of the color filter and a leftmost pixel electrode of the array substrate, the width of the black matrix within the region is predetermined.

In the curved LCD panel of the present invention, one of the regions is positioned at a right side of the color filter substrate, according to a shifted distance between a rightmost color filter of the color filter and a rightmost pixel electrode of the array substrate, a width of the black matrix within the region is predetermined.

In the curved LCD panel of the present invention, the regions comprise at least one left region, at least one right region, and a middle region along the longitudinal direction of the color filter substrate, and a width of black matrix in the left region is larger than a width of black matrix in the middle region, and a width of black matrix in the right region is larger than a width of black matrix in the middle region.

In the curved LCD panel of the present invention, a width of black matrix in the left region and far away from the middle region is larger than a width of black matrix in the left region and close to the middle region.

In the curved LCD panel of the present invention, a width of black matrix in the right region and far away from the middle region is larger than a width of black matrix in the right region and close to the middle region.

In the curved LCD panel of the present invention, the at least one left region and the at least one right region are positioned symmetrically at the left side and the right side of the middle region, respectively.

Still another object of the present invention is to provide a curved LCD apparatus comprising a backlight module and a curved LCD panel. The backlight module comprises: at least one light source emitting light rays; and a light guide plate transmitting the light rays. The curved LCD panel receives the light rays transmitted from the light guide plate and comprises: a curved color filter substrate comprising a black matrix and color filters; and a cured array substrate opposite the color filter substrate and comprising pixel electrodes, data lines, and scan lines wherein the pixel electrodes correspond to the color filters, respectively; wherein a plurality of regions are formed along a longitudinal direction of the color filter substrate, and in each of the regions of the color filter substrate, according to a greatest shifted distance between the color filter and the array substrate, a width of the black matrix within the region is predetermined to prevent the color shifting phenomenon from occurring in the region.

In the curved LCD apparatus of the present invention, one of the regions is positioned at a left side of the color filter substrate, according to a shifted distance between a leftmost color filter of the color filter and a leftmost pixel electrode of the array substrate, the width of the black matrix within the region is predetermined.

In the curved LCD apparatus of the present invention, one of the regions is positioned at a right side of the color filter substrate, according to a shifted distance between a rightmost color filter of the color filter and a rightmost pixel electrode of the array substrate, a width of the black matrix within the region is predetermined.

In the curved LCD apparatus of the present invention, the regions comprise at least one left region, at least one right region, and a middle region along the longitudinal direction of the color filter substrate, and a width of black matrix in the left region is larger than a width of black matrix in the middle region, and a width of black matrix in the right region is larger than a width of black matrix in the middle region.

In the curved LCD apparatus of the present invention, a width of black matrix in the left region and far away from the middle region is larger than a width of black matrix in the left region and close to the middle region.

In the curved LCD apparatus of the present invention, a width of black matrix in the right region and far away from the middle region is larger than a width of black matrix in the right region and close to the middle region.

In the curved LCD apparatus of the present invention, the at least one left region and the at least one right region are positioned symmetrically at the left side and the right side of the middle region, respectively.

In the curved LCD apparatus of the present invention, according to the widths of the black matrix in the regions, a brightness in regions of the light guide plate is adjusted.

In the conventional curved LCD panel and apparatus, the color shifting phenomenon results from a shifted distance between the color filter substrate and the array substrate, thereby deteriorating a display quality of the LCD. In comparison to the prior art, the black matrix in the curved LCD panel and the curved LCD apparatus of the present invention can have different widths in the different regions to prevent the color shifting phenomenon.

The structure and the technical means adopted by the present invention to achieve the above-mentioned and other objects can be best understood by referring to the following detailed description of the preferred embodiments and the accompanying drawings.

DETAILED DESCRIPTION OF THE PREFERRED EMBODIMENTS

The following embodiments are referring to the accompanying drawings for exemplifying specific implementable embodiments of the present invention. Furthermore, directional terms described by the present invention, such as upper, lower, front, back, left, right, inner, outer, side, etc., are only directions by referring to the accompanying drawings, and thus the used directional terms are used to describe and understand the present invention, but the present invention is not limited thereto.

In drawings, elements with a similar structure have the same reference number.

Figure 2:
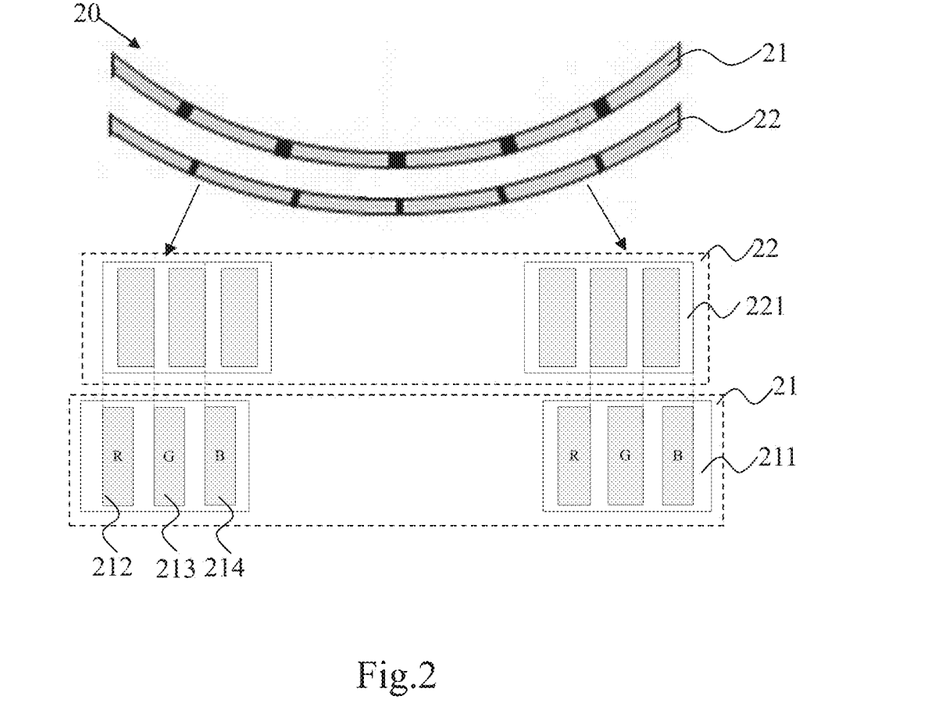
FIG. 2 illustrates a schematic diagram and a partially structural view showing a curved LCD according to a first embodiment of the present invention.

Referring to FIG. 2, a schematic diagram and a partially structural view showing a curved LCD according to a first embodiment of the present invention are illustrated therein. The curved LCD panel 20 of the present embodiment comprises a cured color filter substrate 21 and a cured array substrate 22.

As shown in FIG. 2, the color filter substrate 21 comprises a black matrix 211 and color filters, and the color filters comprise red filters 212, green filters 213, and blue filters 214. The array substrate 22 is opposite the color filter substrate 21 and comprises pixel electrodes 221, data lines (not shown), and scan lines (not shown). The pixel electrodes 221 of the array substrate 22 correspond to the color filters of the color filter substrate 21, respectively. The light rays from the pixel electrodes and passing through the color filter substrate 21 can be red, green, or blue.

As shown in FIG. 2, the cured color filter substrate 21 is opposite the cured array substrate 22, and the color filters of the color filter substrate 21 and the pixel electrodes 221 of the array substrate 22 may be shifted a distance with respect to each other. At a left side of the curved LCD panel 20, the color filters of the color filter substrate 21 are shifted leftward a distance with respect to the corresponding pixel electrodes 221. At a right side of the curved LCD panel 20, the color filters of the color filter substrate 21 are shifted rightward a distance with respect to the corresponding pixel electrodes 221.

To prevent the color shifting phenomenon, in the color filter substrate 21 of the curved LCD panel 20 of the present embodiment, two regions are formed along a longitudinal direction of the color filter substrate 21, and the two regions are positioned symmetrically with respect to the central axis of the color filter substrate 21. At the leftmost side or the rightmost side of the color filter substrate 21, a shifted distance between the color filter substrate 21 and the corresponding pixel electrode 221 is greatest. In one of the regions positioned at the left side of the color filter substrate 21, according to a shifted distance between a leftmost color filter of the color filter and a leftmost pixel electrode 221 of the array substrate 22, i.e. according to the greatest shifted distance, a width of the black matrix 211 within the region (the left region) is predetermined to prevent the color shifting phenomenon from occurring in the region (the left region) of the curved LCD panel 20. In one of the regions positioned at the right side of the color filter substrate 21, according to a shifted distance between a rightmost color filter of the color filter substrate 21 and a rightmost pixel electrode 221 of the array substrate 22, i.e. according to the greatest shifted distance, a width of the black matrix 211 within the region (the right region) is predetermined to prevent the color shifting phenomenon from occurring in the region (the right region) of the curved LCD panel 20.

In the curved LCD panel 20 of the present embodiment, the black matrix 211 can have different widths in the left region and the right region, so as to prevent that the light rays from one of the pixel electrodes 221 are emitted to an adjacent color filter (the wrong color filter), but not the corresponding color filter, i.e. preventing the color shifting phenomenon. Moreover, the color filter substrate 21 and the array substrate 22 are disposed symmetrically, and the widths of the black matrix 211 in the left region and the right region of the color filter substrate 21 are determined symmetrically. That is, the black matrix 211 in the left region and the right region may have different widths, but can have the same area, so as to form the same brightness at the left side and the right side of the curved LCD panel 20, thereby preventing a brightness difference in the curved LCD panel 20.

In the curved LCD panel of the present embodiment, the black matrix can have different widths in the different regions for preventing the color shifting phenomenon.

Figure 3:
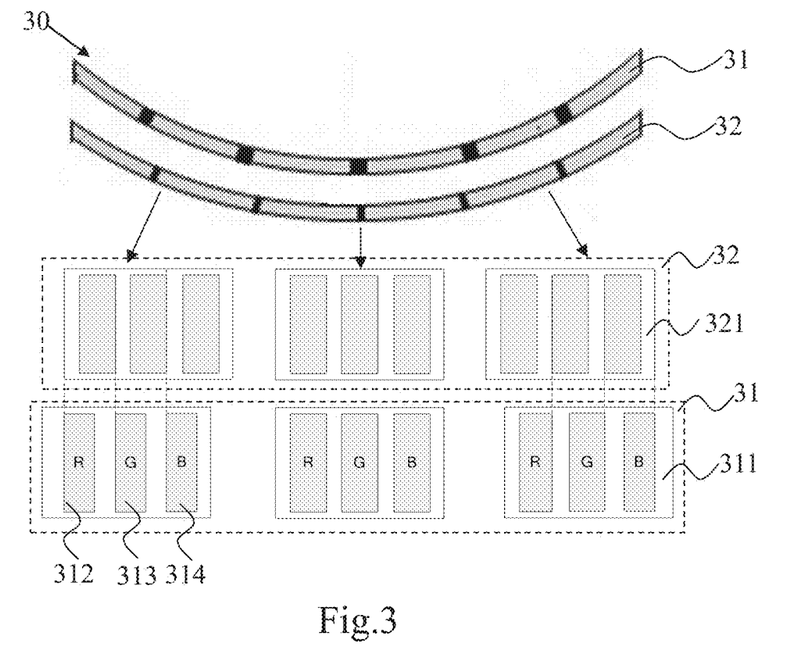
FIG. 3 illustrates a schematic diagram and a partially structural view showing a curved LCD according to a second embodiment of the present invention.

Referring to FIG. 3, a schematic diagram and a partially structural view showing a curved LCD according to a second embodiment of the present invention are illustrated. The curved LCD panel 30 of the present embodiment comprises a cured color filter substrate 31 and a cured array substrate 32.

As shown in FIG. 3, the color filter substrate 31 comprises a black matrix 311 and color filters, and the color filters comprise red filters 312, green filters 313, and blue filters 314. The array substrate 32 is opposite the color filter substrate 31 and comprises pixel electrodes 321, data lines (not shown), and scan lines (not shown). The pixel electrodes 321 of the array substrate 32 correspond to the color filters of the color filter substrate 31, respectively. The light rays from the pixel electrodes and passing through the color filter substrate 31 can be red, green, or blue.

As shown in FIG. 3, the cured color filter substrate 31 is opposite the cured array substrate 32, and the color filters of the color filter substrate 31 and the pixel electrodes 321 of the array substrate 32 may be shifted a distance with respect to each other. At a left side of the curved LCD panel 30, the color filters of the color filter substrate 31 are leftward shifted a distance with respect to the corresponding pixel electrodes 321. At a right side of the curved LCD panel 30, the color filters of the color filter substrate 31 are rightward shifted a distance with respect to the corresponding pixel electrodes 321.

To prevent the color shifting phenomenon, in the color filter substrate 31 of the curved LCD panel 30 of the present embodiment, three regions are formed along a longitudinal direction of the color filter substrate 31, and the three regions comprise a left region, a middle region, and a right region. The left region and the right region are positioned symmetrically at the left side and the right side of the middle region, respectively. At the leftmost side or the rightmost side of the color filter substrate 31, a shifted distance between the color filter and the corresponding pixel electrode 321 is greatest. In one of the regions positioned at the left side of the color filter substrate 31, according to a shifted distance between a leftmost color filter of the color filter and a leftmost pixel electrode 321 of the array substrate 32, i.e. according to the greatest shifted distance, a width of the black matrix 311 within the region (the left region) is predetermined to prevent the color shifting phenomenon from occurring in the region (the left region) of the curved LCD panel 30. In one of the regions positioned at the right side of the color filter substrate 31, according to a shifted distance between a rightmost color filter of the color filter substrate 31 and a rightmost pixel electrode 321 of the array substrate 32, i.e. according to the greatest shifted distance, a width of the black matrix 311 within the region (the right region) is predetermined to prevent the color shifting phenomenon from occurring in the region (the right region) of the curved LCD panel 30.

In the middle region of the color filter substrate 31, a shifted distance between the color filter and the corresponding pixel electrode 321 is smallest, and the color shifting phenomenon will not occur in the middle region of the curved LCD panel 30. Therefore, the widths of the black matrix 311 within the middle region are not required to be adjusted according to the shifted distance between the color filter and the corresponding pixel electrode 321.

Therefore, in the color filter substrate 31 of the curved LCD panel 30 of the present embodiment, a width of black matrix 311 in the left region is larger than a width of black matrix 311 in the middle region, and similarly, a width of black matrix 311 in the right region is also larger than a width of black matrix 311 in the middle region.

In the curved LCD panel 30 of the present embodiment, the black matrix 311 can have different widths in the left region and the right region, so as to prevent that the light rays from one of the pixel electrodes 321 are emitted to an adjacent color filter (the wrong color filter), but not the corresponding color filter, i.e. preventing the color shifting phenomenon. Moreover, the width of black matrix 311 in the middle region is smaller, and thus an aperture ratio of the curved LCD panel 30 can be promoted for improving a display efficiency of the curved LCD panel 30.

Compared with the first embodiment, in the curved LCD panel of the present embodiment, the width of black matrix in the middle region can be smaller for improving the display efficiency and the aperture ratio of the curved LCD panel.

Figure 4:
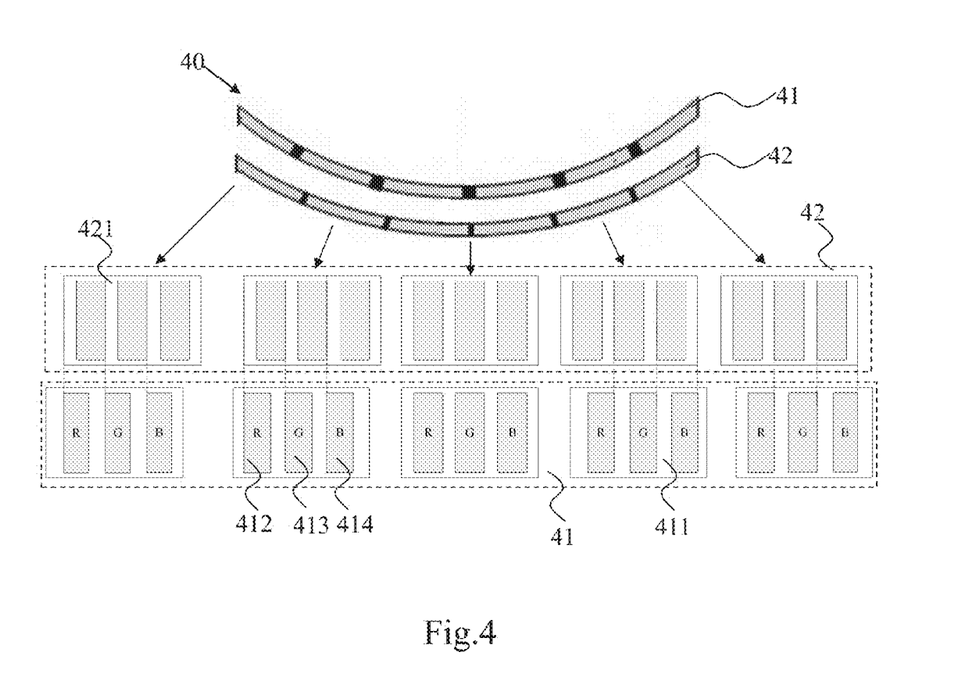
FIG. 4 illustrates a schematic diagram and a partially structural view showing a curved LCD according to a third embodiment of the present invention.

Referring to FIG. 4, a schematic diagram and a partially structural view showing a curved LCD according to a second embodiment of the present invention are illustrated. The curved LCD panel 40 of the present embodiment comprises a cured color filter substrate 41 and a cured array substrate 42.

As shown in FIG. 4, the color filter substrate 41 comprises a black matrix 411 and color filters, and the color filters comprise red filters 412, green filters 413, and blue filters 414. The array substrate 42 is opposite the color filter substrate 41 and comprises pixel electrodes 421, data lines (not shown), and scan lines (not shown). The pixel electrodes 421 of the array substrate 42 correspond to the color filters of the color filter substrate 41, respectively. The light rays from the pixel electrodes and passing through the color filter substrate 41 can be red, green, or blue.

As shown in FIG. 4, the cured color filter substrate 41 is opposite the cured array substrate 42, and the color filters of the color filter substrate 41 and the pixel electrodes 421 of the array substrate 42 may be shifted a distance with respect to each other. At a left side of the curved LCD panel 40, the color filters of the color filter substrate 41 are leftward shifted a distance with respect to the corresponding pixel electrodes 421. At a right side of the curved LCD panel 40, the color filters of the color filter substrate 41 are rightward shifted a distance with respect to the corresponding pixel electrodes 421.

To prevent the color shifting phenomenon, in the color filter substrate 41 of the curved LCD panel 40 of the present embodiment, five regions are formed along a longitudinal direction of the color filter substrate 41, and the five regions comprise two left regions, a middle region, and two right regions. The two left regions and the two right regions are positioned symmetrically at the left side and the right side of the middle region. At the leftmost side or the rightmost side of the color filter substrate 41, a shifted distance between the color filter and the corresponding pixel electrode 421 is greatest. In one of the regions positioned at the left side of the color filter substrate 41, according to a shifted distance between a leftmost color filter of the color filter and a leftmost pixel electrode 421 of the array substrate 42, i.e. according to the greatest shifted distance, a width of the black matrix 411 within the region (the left region) is predetermined to prevent the color shifting phenomenon from occurring in the region (the left region) of the curved LCD panel 40. In one of the regions positioned at the right side of the color filter substrate 41, according to a shifted distance between a rightmost color filter of the color filter substrate 41 and a rightmost pixel electrode 421 of the array substrate 42, i.e. according to the greatest shifted distance, a width of the black matrix 411 within the region (the right region) is predetermined to prevent the color shifting phenomenon from occurring in the region (the right region) of the curved LCD panel 40.

In the middle region of the color filter substrate 41, a shifted distance between the color filter and the corresponding pixel electrode 421 is smallest, and the color shifting phenomenon will not occur in the middle region of the curved LCD panel 40. Therefore, the widths of the black matrix 411 within the middle region are not required to be adjusted according to the shifted distance between the color filter and the corresponding pixel electrode 421.

Therefore, in the color filter substrate 41 of the curved LCD panel 40 of the present embodiment, a width of black matrix 411 in the left region is larger than a width of black matrix 411 in the middle region, and similarly, a width of black matrix 411 in the right region is also larger than a width of black matrix 411 in the middle region.

A width of black matrix 411 in the left region and far away from the middle region is larger than a width of black matrix 411 in the left region and close to the middle region. That is, in the two left regions, a width of black matrix 411 far away from the middle region is larger than a width of black matrix 411 close to the middle region.

A width of black matrix 411 in the right region and far away from the middle region is larger than a width of black matrix 411 in the right region and close to the middle region. That is, in the two right regions, a width of black matrix 411 far away from the middle region is larger than a width of black matrix 411 close to the middle region.

In the curved LCD panel 40 of the present embodiment, the black matrix 411 can have different widths in the left regions and the right regions, so as to prevent that the light rays from one of the pixel electrodes 421 are emitted to an adjacent color filter (the wrong color filter), but not the corresponding color filter, i.e. preventing the color shifting phenomenon. Moreover, the width of black matrix 411 close to the middle region is smaller, and thus an aperture ratio of the curved LCD panel 40 can be promoted for improving a display efficiency of the curved LCD panel 40.

Compared with the second embodiment, in the curved LCD panel of the present embodiment, the plurality of the left regions and the right regions are formed improving the display efficiency and the aperture ratio of the curved LCD panel.

The present invention further provides a curved LCD apparatus. The curved LCD apparatus comprises a backlight module and the curved LCD panel. The backlight module may comprise at least one light source and a light guide plate, and the light source emits light rays, and the light guide plate transmits the light rays to the curved LCD panel. The curved LCD panel of the present embodiment comprises a cured color filter substrate and a cured array substrate.

The color filter substrate comprises a black matrix and color filters, and the color filters can comprise red filters, green filters, and blue filters. The array substrate is opposite the color filter substrate and comprises pixel electrodes, data lines, and scan lines. The pixel electrodes of the array substrate correspond to the color filters of the color filter substrate, respectively. The light rays from the pixel electrodes and passing through the color filter substrate can be red, green, or blue.

The cured color filter substrate is opposite the cured array substrate, and the color filters of the color filter substrate and the pixel electrodes of the array substrate may be shifted a distance with respect to each other. At a left side of the curved LCD panel, the color filters of the color filter substrate are leftward shifted a distance with respect to the corresponding pixel electrodes. At a right side of the curved LCD panel, the color filters of the color filter substrate are rightward shifted a distance with respect to the corresponding pixel electrodes.

To prevent the color shifting phenomenon, in the color filter substrate of the curved LCD panel of the present embodiment, a plurality of regions are formed along a longitudinal direction of the color filter substrate. In each region, according to the greatest shifted distance between the color filter substrate and the array substrate, a width of the black matrix within the corresponding region is predetermined to prevent the color shifting phenomenon from occurring in this region of the curved LCD panel.

Since the black matrix can have different widths in the different regions, the brightness in the different regions may be different. In the curved LCD panel of the present embodiment, according to the different widths of the black matrix in the different regions, the backlight module can adjust the brightness in different regions of the light guide plate for achieving a consistent brightness to display images.

In the curved LCD panel and the curved LCD apparatus of the present invention, the black matrix can have different widths in the different regions to prevent the color shifting phenomenon. In the conventional curved LCD panel and apparatus, the color shifting phenomenon results from a shifted distance between the color filter substrate and the array substrate, thereby deteriorating a display quality of the LCD.

The present invention has been described above with a preferred embodiment thereof, and it is understood that many changes and modifications to the described embodiment can be carried out without departing from the scope and the spirit of the invention that is intended to be limited only by the appended claims.

What is claimed is:

1. A curved LCD panel comprising:
a curved color filter substrate comprising a black matrix and color filters; and
a cured array substrate opposite the color filter substrate and comprising pixel electrodes, wherein the pixel electrodes correspond to the color filters, respectively;
wherein a plurality of regions are formed along a longitudinal direction of the color filter substrate, and in a left one of the regions which is positioned at a left side of the color filter substrate, a width of the black matrix within this left one of the regions is predetermined according to a shifted distance between a leftmost color filter of the color filter and a leftmost pixel electrode of the array substrate, to prevent a color shifting phenomenon from occurring in this left one of the regions;
wherein, in a right one of the regions which is positioned at a right side of the color filter substrate, a width of the black matrix within this right one of the regions is predetermined according to a shifted distance between a rightmost color filter of the color filter and a rightmost pixel electrode of the array substrate, to prevent the color shifting phenomenon from occurring in this right one of the regions;
wherein the regions comprise at least one left region, at least one right region, and a middle region along the longitudinal direction of the color filter substrate, and a width of black matrix in the left region is larger than a width of black matrix in the middle region, and a width of black matrix in the right region is larger than a width of black matrix in the middle region; wherein
a width of black matrix being positioned in a left region which is farther away from the middle region is larger than a width of black matrix being positioned in another left region which is close to the middle region.

2. The curved LCD panel according to claim 1, wherein a width of black matrix being positioned in a right region which is farther away from the middle region than another right region is larger than a width of black matrix being positioned in said another right region.

3. The curved LCD panel according to claim 1, wherein the at least one left region and the at least one right region are positioned symmetrically at the left side and the right side of the middle region, respectively.

4. A curved LCD panel comprising:
a curved color filter substrate comprising a black matrix and color filters; and
a cured array substrate opposite the color filter substrate and comprising pixel electrodes, wherein the pixel electrodes correspond to the color filters, respectively;
wherein a plurality of regions are formed along a longitudinal direction of the color filter substrate, and in each of the regions of the color filter substrate, a width of the black matrix within one region is predetermined according to a greatest shifted distance between the color filter and the array substrate, to prevent a color shifting phenomenon from occurring in this one region.

5. The curved LCD panel according to claim 4, wherein, in a left one of the regions which is positioned at a left side of the color filter substrate, the width of the black matrix within the left one of the regions is predetermined according to a shifted distance between a leftmost color filter of the color filter and a leftmost pixel electrode of the array substrate.

6. The curved LCD panel according to claim 4, wherein, in a right one of the regions which is positioned at a right side of the color filter substrate, a width of the black matrix within the right one of the regions is predetermined according to a shifted distance between a rightmost color filter of the color filter and a rightmost pixel electrode of the array substrate.

7. The curved LCD panel according to claim 4, wherein the regions comprise at least one left region, at least one right region, and a middle region along the longitudinal direction of the color filter substrate, and a width of black matrix in the left region is larger than a width of black matrix in the middle region, and a width of black matrix in the right region is larger than a width of black matrix in the middle region.

8. The curved LCD panel according to claim 7, wherein a width of black matrix being positioned in a left region which is farther away from the middle region than another left region is larger than a width of black matrix being positioned in said another left region.

9. The curved LCD panel according to claim 7, wherein a width of black matrix being positioned in a right region which is farther away from the middle region than another right region is larger than a width of black matrix being positioned in said another right region.

10. The curved LCD panel according to claim 7, wherein the at least one left region and the at least one right region are positioned symmetrically at the left side and the right side of the middle region, respectively.

11. A curved LCD apparatus comprising:
a curved LCD panel comprising:
a curved color filter substrate comprising a black matrix and color filters; and
a cured array substrate opposite the color filter substrate and comprising pixel electrodes, wherein the pixel electrodes correspond to the color filters, respectively;
wherein a plurality of regions are formed along a longitudinal direction of the color filter substrate, and in each of the regions of the color filter substrate, a width of the black matrix within one region is predetermined according to a greatest shifted distance between the color filter and the array substrate, to prevent a color shifting phenomenon from occurring in this one region.

12. The curved LCD apparatus according to claim 11, wherein, in a left one of the regions which is positioned at a left side of the color filter substrate, the width of the black matrix within the left one of the regions is predetermined according to a shifted distance between a leftmost color filter of the color filter and a leftmost pixel electrode of the array substrate.

13. The curved LCD apparatus according to claim 11, wherein, in a right one of the regions which is positioned at a right side of the color filter substrate, a width of the black matrix within the right one of the regions is predetermined according to a shifted distance between a rightmost color filter of the color filter and a rightmost pixel electrode of the array substrate.

14. The curved LCD apparatus according to claim 11, wherein the regions comprise at least one left region, at least one right region, and a middle region along the longitudinal direction of the color filter substrate, and a width of black matrix in the left region is larger than a width of black matrix in the middle region, and a width of black matrix in the right region is larger than a width of black matrix in the middle region.

15. The curved LCD apparatus according to claim 14, wherein a width of black matrix being positioned in a left region which is farther away from the middle region than another left region is larger than a width of black matrix being positioned in said another left region.

16. The curved LCD apparatus according to claim 14, wherein a width of black matrix being positioned in a right region which is farther away from the middle region than another right region is larger than a width of black matrix being positioned in said another right region.

17. The curved LCD apparatus according to claim 14, wherein the at least one left region and the at least one right region are positioned symmetrically at the left side and the right side of the middle region, respectively.

18. The curved LCD apparatus according to claim 11, wherein according to the widths of the black matrix in the regions, a brightness in regions of the light guide plate is adjusted.

* * * * *